United States Patent [19]

Philibert

[11] Patent Number: 4,670,266

[45] Date of Patent: Jun. 2, 1987

[54] NATURAL LEAVEN AND METHOD FOR PRODUCING SAME

[76] Inventor: Michel Philibert, 72, Grande Rue, 01290 Pont de Veyle, France

[21] Appl. No.: 704,091

[22] Filed: Feb. 22, 1985

[30] Foreign Application Priority Data

Oct. 21, 1983 [FR] France ................................ 83 16766

[51] Int. Cl.⁴ .............................................. A21D 8/00
[52] U.S. Cl. ........................................ 426/19; 426/62; 426/21
[58] Field of Search ....................... 426/21, 18, 19, 20, 426/62, 622, 471, 450, 463, 462

[56] References Cited

U.S. PATENT DOCUMENTS

| | | | |
|---|---|---|---|
| 3,851,085 | 11/1974 | Rodgers et al. | 426/463 |
| 3,963,835 | 6/1976 | Gryczka | 426/18 |
| 4,308,285 | 12/1981 | Höhn et al. | 426/18 |
| 4,342,785 | 8/1982 | Zwingl | 426/19 |

FOREIGN PATENT DOCUMENTS

| | | | |
|---|---|---|---|
| 0011045 | of 1892 | United Kingdom | 426/18 |
| 7383 | of 1914 | United Kingdom | 426/62.2 |
| 379678 | 8/1932 | United Kingdom | . |
| 544360 | 4/1942 | United Kingdom | . |

OTHER PUBLICATIONS

Jago, The Technology of Bread-Making, Bakers' Helper Co., Chicago, Ill., 1921, pp. 238-239 and 355.

*Primary Examiner*—Raymond N. Jones
*Assistant Examiner*—Marianne M. Cintins
*Attorney, Agent, or Firm*—Sandler & Greenblum

[57] ABSTRACT

Method for producing leaven is disclosed which involves soaking wheat in water, separating the resultant aqueous medium from the wheat, mixing the aqueous medium with flour to form an aqueous mixture including flour which is then permitted to stand and ultimately form leaven, and finally dehydrating the leaven to produce a storage stable product.

14 Claims, No Drawings

NATURAL LEAVEN AND METHOD FOR PRODUCING SAME

BACKGROUND OF THE INVENTION

1. Technical Field of the Invention

The present invention relates to a method for producing natural leaven. More particularly, the present invention is directed to a method of preparing natural leaven which involves soaking a grain in water for a period of time after which the grain and resultant aqueous medium are separated. The aqueous medium is then mixed with flour. Subsequently, mixtures of flour and aqueous medium are permitted to stand for a period of time, ultimately resulting with natural leaven. The present invention also involves subjecting natural leaven to a procedure whereby its moisture content is reduced, preferably using atomization or spray-drying techniques, and forming the dried leaven into a powder. The natural leaven produced in accordance with the present invention imparts a unique taste and odor to bakery products such as bread, croissants, brioches, and the like. Moreover, the dehydrated leaven produced in accordance with the present invention is particularly advantageous in that it is easy to meter, weigh, and otherwise handle when used in commercial baking operations, in addition to being storage stable for considerable periods of time.

2. Discussion of the Prior Art

In the baking art, a number of different materials or agents are used to provide the leavening or "raising" effect in dough. Typically, these are classified as chemical leavening agents and yeast. In either case, carbon dioxide from added chemical reagents or from yeast fermentation is the principal leavening gas.

In chemically-leavened foods, the source of carbon dioxide is normally sodium bicarbonate. Ammonium bicarbonate as well as potassium bicarbonate may be used in certain applications, as well. Leavening acids are also used to promote a controlled and complete evolution of carbon dioxide from a dough in which the leavening acids are present. In addition, "baking powder", which is a leavening agent produced by mixing an acid-reacting-material and sodium bicarbonate, with or without starch or flour, is also a common ingredient used in the baking industry for this purpose. Typically, the acid-reacting-materials in baking powders are: tartaric acid or its acid salt, acid salts of phosphoric acid, compounds of aluminum, or any combination having a substantial proportion of any of the foregoing.

Historically, yeast, commonly referred to as "baker's yeast", has been the traditional leavening agent commonly used in the production of bread, rolls, sweet doughs, pretzels, crackers, and the like. As opposed to chemical leavening agents, the advantages of yeast include its contribution to the baked product of a characteristic taste and aroma and the evolution of gas for a considerably longer period of time than is effected by chemical agents. In the yeast leavening process, gas is generated by fermentation, which is part of the metabolic activity of yeast. Although many micro-organisms can ferment sugars with the production of carbon dioxide, the one which is generally accepted as being the most suitable for leavening bakery doughs is *Saccharomyces cervisiae*, or "baker's yeast". In this regard, special strains of yeast have been developed over the years by commercial yeast producers which are particularly suitable as leavening for dough products. In addition to producing carbon dioxide, yeast fermentation also produces ethanol which contributes to the aroma of baked products.

Although enzymes present in the yeast cell may break down sucrose and maltose, etc. into simple sugars during fermentation, *Saccharomyces cervisiae* cannot readily break down starch, dextrines, and other complex carbohydrates. It is the action of enzymes present in the flour which are believed to be responsible for the conversion of starches normally present in doughs into sugars, such as dextrose or maltose, which are then acted upon by the yeast.

In addition to using commercial yeast, leavening can be prepared by mixing water with flour and permitting the mixture to incubate under proper conditions of temperature for a sufficient time wherein yeast spores from the ambient come into contact with the moistened wheat thereby permitting fermentation reaction to occur. After a sufficient period of time has lapsed, the resultant mixture is sufficiently innoculated with bacteria so as to be capable of functioning as a "starter" for leavened dough products.

SUMMARY OF THE INVENTION

An object of the present invention is to provide a process for producing leaven having a reduced moisture content made from an aqueous mixture including flour.

Another object of the present invention is to provide a method for producing leaven having a storage stable moisture content which involves dehydrating the leaven, preferably using atomization.

A further object of the present invention is to provide a method for forming a powdered leaven.

And yet another object of the present invention is to provide a method involving soaking a grain in water, separating at least a portion of the resultant aqueous medium from the grain and then mixing the resultant aqueous medium with flour to form an aqueous mixture including flour which is permitted to stand for a period of time in producing leaven.

It is another object of the present invention to provide a method of producing leaven wherein wheat berries are soaked in water for between about 72 and 96 hours at a temperature of about 30° C.

It is yet another object of the present invention to provide a method for producing leaven wherein the grain and water used in the soaking operation are present in the proportions of 43% and 57%, respectively, on a total weight basis.

It is a still further object of the present invention to provide a method wherein, on a total weight basis, preferably 23% of flour is combined with 77% of aqueous medium, in which grain had previously been soaked, to form an aqueous mixture including flour which is preferably permitted to stand for at least about 6 hours in producing leaven.

It is yet another object of the present invention to provide a method for producing leaven wherein additional flour, amounting to at least about 23% and preferably 37.5% on a total weight basis is added to the aqueous mixture including flour after the aqueous mixture has been permitted to stand for a period of time of at least 6 hours, and preferably 24 hours, and then allowing the resultant mixture to stand preferably for an additional 24 hours.

A further object of the present invention is to provide a method which involves mixing at least a portion of a resultant mixture including flour and aqueous medium which has been permitted to stand with equal parts of flour and water, preferably in the proportions on a total weight basis of 3% resultant mixture, 48.5% flour and 48.5% water in producing leaven.

Another object of the present invention is to provide a method wherein 25% leaven is blended with 37.5% water, 18.75% wheat flour and 18.75% rye flour on a total weight basis in producing leven.

A still further object of the present invention is to provide a method for producing bakery products wherein leaven produced in accordance with the present invention is mixed with essential dough ingredients to form a dough which is permitted to rise before being baked.

DETAILED DESCRIPTION AND PREFERRED EMBODIMENT

The present invention is based on the discovery that improved natural leaven can be produced by a method wherein the initial step involves soaking grain, preferably wheat berries, in an aqueous medium such as water. In its broadest aspects, after the wheat berries have been soaked for a sufficient period of time, the aqueous medium is drained from the wheat and is subsequently mixed with flour and permitted to stand for sufficient periods of time wherein fermentation occurs and a natural leaven is ultimately produced. It has been discovered that mixing the flour with the aqueous medium in which wheat berries had been previously soaked produces superior leavening than if ordinary water is mixed with the flour. While not intending to be bound by any particular theory, it is believed that the aqueous medium separated from the wheat berries contains materials, such as enzymes, leached from the wheat berries which enhance the conversion of protein and starch materials in the flour into simpler forms which can be more readily attacked by the yeast from the atmosphere thereby accelerating and enhancing the fermentation which occurs during the periods of time when the mixture of flour and aqueous medium is permitted to stand.

In the preferred embodiments, the resultant leaven is subjected to a procedure wherein its moisture content is reduced, preferably to a storage stable extent, by dehydration, preferably using an atomization procedure or a spray-drying technique. A pulverant product, preferably in the form of a powder, may then be formed which is ready for use and which can be mixed in relatively small portions with essential dough ingredients, such as flour and water, in preparation of a dough suitable for baking.

The invention will now be described in greater detail by reference to one particular mode considered to be preferred for its performance for purposes of the present invention.

In accordance with the present invention, leaven is prepared by first soaking wheat in water. On a total weight basis, preferably 43% of wheat is soaked in 57% of water. The resultant mixture is then permitted to stand for as long as 72 to 96 hours, preferably at a temperature of about 30° C. After soaking, the resultant aqueous medium is drained or is otherwise separated from the wheat and then mixed in a proportion on a total weight basis of 77% with 23% flour. Although any flour typically used in the baking industry can be used, wheat flour is preferred. The mixture of flour and aqueous medium is then permitted to stand for at least about 6 hours and preferably 24 hours. Afterwards, the same procedure may be repeated, i.e., additional amounts of wheat flour are added to the mixture and the resultant mixtures are permitted to stand for an additional 24 hours. On a total weight basis, the additional flour initially added at this stage is preferably about 23%.

After the aqueous mixture including flour has been permitted to stand for the prescribed time, an additional 37.5% on a total weight basis of wheat flour is added to the aqueous mixture. The total amount of the aqueous mixture is then agitated or otherwise mixed together, preferably by stirring, and is once again permitted to stand for another 24 hours. By this time, the aqueous mixture has assumed the consistency of a paste.

The paste is then divided up into kilogram batches. One liter of water and one kilogram of flour are then mixed with each of kilogram of paste. The resultant admixture is then preferably stirred before being permitted to stand for at least six hours, and preferably between six to 24 hours.

The resultant admixture is then separated into three kilogram batches each of which can be mixed with 50 liters of water and 50 kilograms of wheat flour. The entire mixture, while being maintained at a temperature between about 26°-28° C., is then stored for between 24 and 36 hours. This operation produces about 100 kilograms of leaven which is subsequently used to produce a 400-kilogram batch of leaven, as discussed herein. It is important, however, to retain 100 kilograms of the resultant leaven future use in the preparation of the next 400-kilogram batch of leaven.

In the preparation of the 400-kilogram batch of leaven, the 100 kilogram portion of leaven, already produced, is mixed with 150 liters of water, 75 kilograms of wheat flour, and 75 kilograms of rye flour. It is preferable to stir these ingredients as they are being mixed together.

From the 400 kilograms of leaven produced by this preparation. A 100-kilogram batch is separated and stored for a different production. The remaining 300 kilograms of leaven is then preferably subjected to a dehydration procedure to reduce its moisture content to a storage stable extent. Particularly good results are achieved when dehydration is effected using an atomization or spray-drying technique. In the preferred dehydration techniques, the leaven is dispersed in the form of fine droplets which are exposed to currents of hot air, preferably having a temperature of about 60° C. Typically, the leaven is sprayed or atomized into the top of a chamber along with heated air. Thus, the droplets dry as they fall to the bottom of the drying chamber. Chambers used in such dehydration methods typically have the shape of an upturned, truncated cone. The leaven droplets may then collected at the bottom of the drying chamber, for example on a screen or belt, and transferred to another chamber wherein additional moisture is removed, if necessary.

The dehydrated leaven may also be subjected to conventional size reduction techniques, such as screening, grinding, or pulverizing, to obtain a powder of desired grain-size.

The dehyrated leaven powder obtained in accordance with the present invention, is sufficiently storage stable to keep well for extended periods of time. In addition, because of its dry condition, it is easy to handle and use. All that is required is that a prescribed amount of the dehydrated leaven powder be mixed with essential dough ingredients such as flour and water in the preparation of dough to be used in bakery products. Typically, 25-30 grams of leaven powder is mixed with each kilogram of flour in the preparation of bread.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for producing leaven comprising:
   soaking a grain in an aqueous medium;
   separating at least a portion of said aqueous medium from said grain;
   combining the separated aqueous medium with flour
   allowing an aqueous mixture of said aqueous medium and flour to stand for a period of time of at least 6 hours;
   adding an additional quantity of flour amounting to at least about 23% on a total weight basis to result in another aqueous mixture;
   permitting said another aqueous mixture to stand for at least 24 hours to produce leaven; and
   dehydrating said leaven to a storage stable moisture content.

2. The method of claim 1, wherein said dehydrating comprises atomization.

3. The method of claim 1, further comprising forming said leaven into a powder.

4. The method of claim 1, wherein said soaking proceeds for a period of time within the range of about 72 to 96 hours at a temperature of about 30° C.

5. The method of claim 1, wherein said grain and said water are present in the proportions of about 43% and 57% on a total weight basis, respectively, during soaking.

6. The method of claim 1, wherein said period of time is at least about 24 hours.

7. The method of claim 1, wherein said additional quantity of flour is about 37.5% on a total weight basis.

8. The method of claim 7, further comprising:
   mixing at least a portion of said another aqueous mixture with equal parts of flour and water to form a mixture.

9. The method of claim 8, wherein said mixture is stored for between about 24 to 36 hours at a temperature of about 26° to 28° C.

10. The method of claim 8, wherein, 3% said another aqueous mixture, 48.5% flour and 48.5% water on a total weight basis, are mixed together.

11. The method of claim 10, further comprising:
    blending 25% leaven with 37.5% water, 18.75% wheat flour and 18.75% rye flour, on a total weight basis.

12. The method of claim 1, wherein said grain is wheat.

13. The method of claim 12, wherein said wheat is in the form of wheat berries.

14. A method for producing leaven comprising:
    soaking a grain in an aqueous medium for a period of time within the range of about 72-96 hours at a temperature of about 30° C.;
    separating at least a portion of said aqueous medium from said grain;
    combining the separated aqueous medium with flour to form an aqueous mixture including about 23% by weight flour and about 77% by weight aqueous medium on a total weight basis;
    allowing said aqueous mixture to stand for at least about 24 hour;
    adding an additional quantity of flour amounting to about 37.5% on a total weight basis to result in another aqueous mixture;
    permitting said another aqueous mixture to stand for at least 24 hours;
    mixing at least a portion of said another aqueous mixture with equal parts of flour and water and storing for between about 24 to 36 hours at a temperature of about 26° to 28° C. to produce a resultant mixture;
    mixing about 3% by weight of said resultant mixture, about 48.5% by weight flour and about 48.5% by weight water on a total weight basis to produce leaven; and
    dehydrating said leaven to a storage stable moisture content.

* * * * *

UNITED STATES PATENT AND TRADEMARK OFFICE
CERTIFICATE OF CORRECTION

PATENT NO. : 4,670,266
DATED : June 2, 1987
INVENTOR(S) : Michel PHILIBERT

It is certified that error appears in the above-identified patent and that said Letters Patent is hereby corrected as shown below:

At column 3, line 11 change "leven" to ---leaven---.
At column 4, line 55 insert ---be--- after "then".
In claim 14, line 12 change "hour" to ---hours---.

Signed and Sealed this

Twenty-seventh Day of September, 1988

Attest:

DONALD J. QUIGG

*Attesting Officer*         *Commissioner of Patents and Trademarks*